United States Patent
Fan et al.

(10) Patent No.: US 8,738,802 B2
(45) Date of Patent: May 27, 2014

(54) FORWARDING TRAFFIC FLOW IN INTELLIGENT RESILIENT FRAMEWORK SYSTEM

(75) Inventors: Chi Fan, Beijing (CN); Yong Wang, Beijing (CN); Dehan Yan, Beijing (CN)

(73) Assignee: Hangzhou H3C Technologies Co., Ltd., Zhejiang, Hangzhou ( * ) Notice: Subject to any disclaimer, the term of this patent is extended or adjusted under 35 U.S.C. 154(b) by 0 days.

(21) Appl. No.: 13/884,575

(22) PCT Filed: Oct. 18, 2011

(86) PCT No.: PCT/CN2011/080913
§ 371 (c)(1),
(2), (4) Date: May 9, 2013

(87) PCT Pub. No.: WO2012/065488
PCT Pub. Date: May 24, 2012

(65) Prior Publication Data
US 2013/0232202 A1    Sep. 5, 2013

(30) Foreign Application Priority Data
Nov. 18, 2010 (CN) .......................... 2010 1 0552345

(51) Int. Cl.
*G06F 15/173*  (2006.01)
(52) U.S. Cl.
USPC .......................................... 709/239; 709/238
(58) Field of Classification Search
USPC ....................................................... 710/316
See application file for complete search history.

(56) References Cited

U.S. PATENT DOCUMENTS

| | | | |
|---|---|---|---|
| 7,782,869 B1 * | 8/2010 | Chitlur Srinivasa | 370/395.41 |
| 8,402,454 B2 * | 3/2013 | Wang et al. | 717/172 |
| 2002/0184376 A1 * | 12/2002 | Sternagle | 709/230 |
| 2003/0169748 A1 * | 9/2003 | Weyman et al. | 370/401 |
| 2007/0050495 A1 * | 3/2007 | Sridhar et al. | 709/223 |
| 2007/0127464 A1 * | 6/2007 | Jain et al. | 370/389 |
| 2012/0102217 A1 * | 4/2012 | Cardona et al. | 709/235 |

FOREIGN PATENT DOCUMENTS

| | | |
|---|---|---|
| CN | 101478492 | 7/2009 |
| CN | 101572646 | 11/2009 |
| CN | 101692646 | 4/2010 |

OTHER PUBLICATIONS

Hangzhou H3C Technologies Co., Ltd., IRF2.0 Technology White Paper, 2010.
International Search Report and Written Opinion dated Jan. 19, 2012 issued on PCT Patent Application No. PCT/CN2011/080913 dated Oct. 18, 2011, The State Intellectual Property Office, the P.R. China.

(Continued)

*Primary Examiner* — Peling Shaw

(57) ABSTRACT

A method and member device for forwarding service messages in an Intelligent Resilient Framework (IRF) system and an IRF system. In the method, each member device in the IRF system is allocated to at least two virtual devices, and at least one stack link for each virtual device is configured in order to connect interface boards among different member devices. When it is determined according to a forwarding entry of an interface board in a first member device receiving a service message that the service message is to be transmitted to a second member device, the service message is forwarded via the at least one stack link configured for the virtual device of that interface board.

14 Claims, 2 Drawing Sheets

(56) References Cited

OTHER PUBLICATIONS

CN First Office Action dated Mar. 3, 2014 issued on CN Patent Application No. 201010552345.X dated Nov. 18, 2010, The State Intellectual Property Office, P.R. China.
Extended European Search Report dated Feb. 14, 2014 issued on EP Patent Application No. 11841600.7 dated Oct. 18, 2011, European Patent Office.
Nadas S et al: Virtual Router Redundancy Protocol (VRRP) Version 3 for IPV4 and IPV6; rfc5798.txt, Virtual Router Redundancy Protocol (VRRP) Version 3 for IPV4 and IPV6; RFC5798.Txt, Internet Engineering Task Force, IETF; Standard, Internet Society (ISOC) 4, Rue des Falaises CH-1205 Geneva, Switzerlad, Mar. 10, 2010, pp. 1-40, XP015068221.

* cited by examiner

FORWARDING TRAFFIC FLOW IN INTELLIGENT RESILIENT FRAMEWORK SYSTEM

BACKGROUND

Intelligent Resilient Framework (IRF) technology uses cable to connect multiple physical devices together to form a single logical device. The resulting logical device is commonly referred to as an IRF system. Each physical device that constitutes the IRF system is called a member device, and connections between member devices are known as stack links.

DETAILED DESCRIPTION

Figures 1, 2:
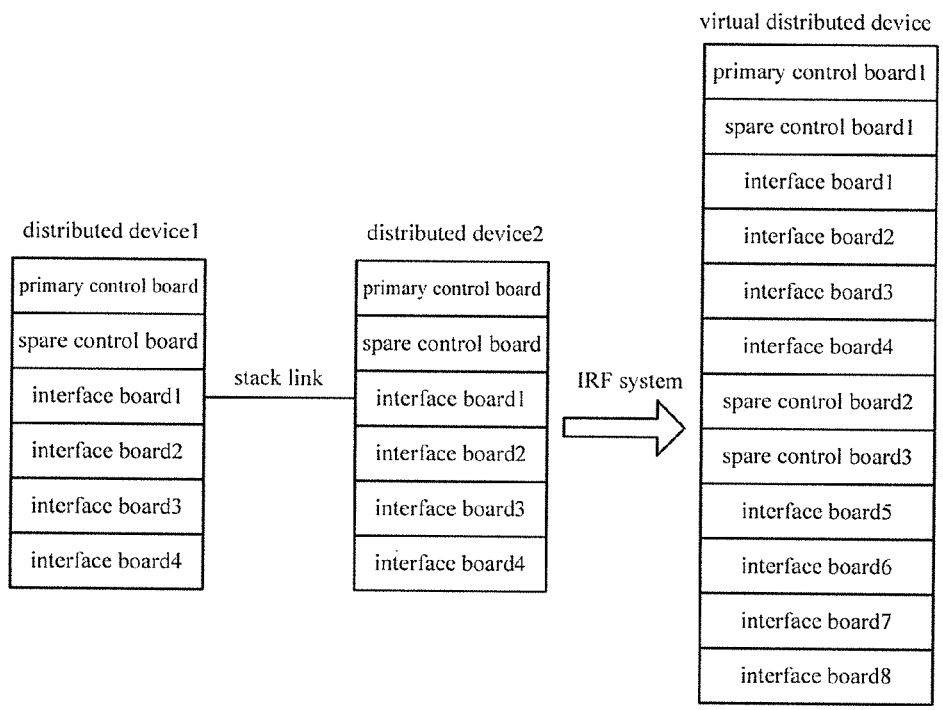
FIG. 1 is a schematic diagram of an IRF system.
FIG. 2 is a schematic diagram illustrating a way of mapping a physical device into multiple logical device.

As shown in FIG. 1, distributed devices 1 and 2 can form a logical device by using stack links. The logical device, labeled "virtual distributed device" in FIG. 1, is considered to be an IRF system. A particular control board is used as a primary control board of the logical device, while other control boards are used as spare control boards.

Virtual device (VD) technology virtualizes a physical device into multiple logical devices. Each logical device is called a VD. Each VD is a stand-alone device from a user's point of view, having its own independently running routing processes, Layer 2 and Layer 3 protocols, forwarding entries and interfaces, etc. Also, each VD can add its users separately, perform independent reset and read its configuration files, all without affecting other VDs.

For a system that can support VD technology, a managing VD will firstly be created when the system starts, which is usually designated as VD1 by default. Other VDs can then only be created and deleted under control of the managing VD. The managing VD is also responsible for managing the resources of other VDs.

When a VD is started, a group of necessary processes of the VD will also be started and isolated from those of other VDs. FIG. 2 is a schematic diagram illustrating a way of mapping a physical device into multiple logical devices. In the illustrated example, four VDs are created at a primary control board. Interface boards are allocated to corresponding VDs. All VDs share a control plane network and a data plane network. However, the forwarding chip at an interface board only belongs to a particular VD, that is, a forwarding chip in an interface board cannot be used for issuing forwarding entries of other VDs except for the VD to which it corresponds.

Figure 3:
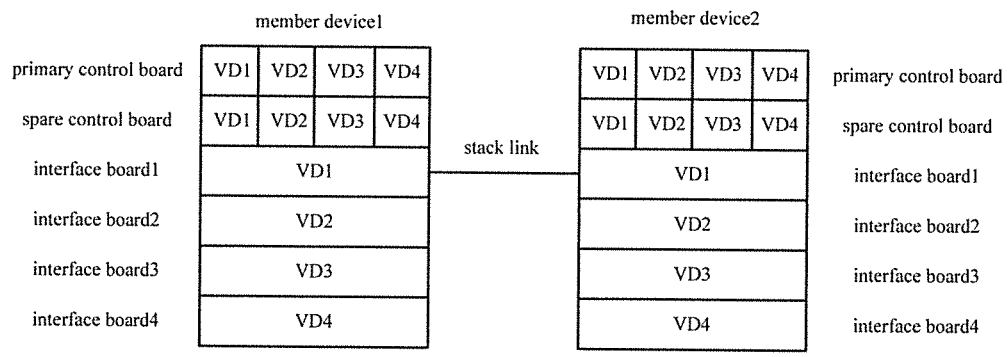
FIG. 3 is a schematic diagram illustrating one possible composition of an IRF system supporting VD technology.

If the IRF and VD technologies are combined, then the VD is supported in the IRF system. That is, the IRF system is built on the basis of a managing VD (i.e., VD1) and virtualized to form a system as shown in FIG. 3. In this IRF system, stack links are responsible for providing the control plane network and data plane network between member devices.

For the control plane network, a stack link is a path shared by all VDs for transmission across member devices in the control plane. For the data plane network, the forwarding chip of the interface board connected to the stack link belongs to VD1. Consequently, VD1 only has its own forwarding entries. Therefore, traffic flow of other VDs will be discarded when it is to be transmitted through the stack link of VD1 since no corresponding forwarding entry can be found. Hence, the stack link does not have the ability to bear transmission across member devices in the data plane for all VDs.

Referring to FIG. 3, VD1 and VD2 are isolated in the data plane, and a traffic flow of VD2 cannot be transmitted from member device 1 to member device 2 through the illustrated stack link. That is, because the stack link is connected to an interface board of each member device that corresponds to VD1 and has no forwarding entries of VD2, the traffic flow transmission of VD2 across member devices can not be achieved on the stack link that is connected to the interface board 1 corresponding to VD1 of either member device.

Consequently, a technical solution is provided as an example for forwarding traffic flow in an Intelligent Resilient Framework (IRF) system, that comprises: each member device of the IRF system is allocated to at least two virtual devices (VD) where the IRF system comprises at least two member devices. Multiple stack links are configured among interface boards of these member devices. For example, interface boards in the two different member devices belonging to the same VD are connected by a stack link.

Thus, when an interface board of a member device receives a service message from the VD corresponding to that interface board, forwarding entries of the interface board are checked. If the service message is to be forwarded across member devices, the interface board is able to forward the service message to another member device through a stack link connected to that interface board which corresponds to the VD sending the service message.

Figure 4:
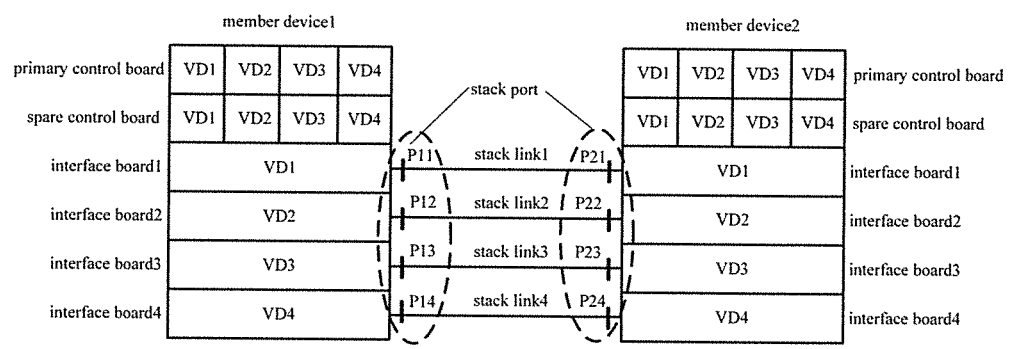
FIG. 4 is a schematic diagram illustrating one possible composition of an IRF system supporting VD technology in an example of the present disclosure.

In the example of FIG. 4, there are stack links between interface boards of different member devices allocated to a managing VD, and also there are stack links between interface boards belonging to every other VD, respectively. As shown in FIG. 4, interface boards in both member devices 1 and 2 belonging to VD1 have stack link 1 between them, interface boards belonging to VD2 have stack link 2, interface boards belonging to VD3 have stack link 3, and interface boards belonging to VD4 have stack link 4.

At the startup of an IRF system, a managing VD is firstly created for implementing VD allocation within the IRF system. Normally, VD1 is set as the managing VD by default. Specifically, the process of VD allocation includes: allocating each control board to at least two VDs; allocating each interface board to a VD among the at least two VDs; performing configuration for other VDs at the control boards and the interface boards by the managing VD; and also configuring, for an interface board which has been allocated to a VD, stack member interfaces of the VD that the interface board belongs to. The stack member interfaces are used for connecting other stack member interfaces on another member device belonging to the same VD in order to establish stack links for the corresponding VD and to successfully forward service messages of the corresponding VD across member devices. In an exemplary implementation, a stack member interface can be a physical interface or logical interface within an interface board.

During the service message forwarding across member devices, the interface board needs to query a local forwarding table. The managing VD forms forwarding entries for a VD according to stack member interfaces of the VD and issues the forwarding entries to interface boards belonging to the corresponding VD in the IRF system.

In addition, the managing VD will designate multiple stack member interfaces in the same member device to form a stack port in order to facilitate management of stack links and the stack member interfaces.

As shown in FIG. 4, when the IRF system starts up, VD1 is firstly created. It is assumed that the IRF system needs to be divided into four VDs, the primary control board and the spare control board are to be used by VD1, VD2, VD3 and VD4. Each interface board is to be used by one of the four VDs. Specifically, as to interface boards of a member device, interface board 1 is designated for use by VD1, interface board 2 is designated for use by VD2, interface board 3 is designated for use by VD3, and interface board 4 is designated for use by VD4. Each member device in the IRF system can perform these configuration tasks.

In addition, a stack member interface for connecting a stack link is configured for each interface board that has been assigned a VD (in this specific implementation, the stack member interface can be a physical stack interface). Per the example illustrated in FIG. 4, member device 1 has physical stack interfaces P11, P12, P13 and P14, which are respectively connected with physical stack interfaces P21, P22, P23 and P24 in member device 2, thus constituting stack link 1, stack link 2, stack link 3 and stack link 4, respectively.

In the example illustrated in FIG. 4, member devices each have both a primary control board and spare control board. As another example, member devices having only a single control board can be used under the principles disclosed in the present disclosure.

For each member device, VD1 at the primary control board forms forwarding entries of a VD according to physical stack interfaces of the VD at each interface board and sends the forwarding entries to the corresponding interface boards. In this way, interface boards 1 shown in FIG. 4 have forwarding entries of VD1 and are responsible for service message transmission across member devices for VD1. Similarly, interface boards 2 have forwarding entries of VD2 and are responsible for service message transmission across member devices for VD2; interface boards 3 have forwarding entries of VD3 and are responsible for service message transmission across member devices for VD3; interface boards 4 have forwarding entries of VD4 and are responsible for service message transmission across member devices for VD4.

It should be noted that, in addition to the situation shown in FIG. 4, multiple interface boards can also be allocated to a VD so that the VD can have multiple stack links for transmitting service messages across member devices. In this case, each interface board is equipped with forwarding entries of the corresponding VD so that either one can transmit service messages across member devices for the corresponding VD.

When it is determined that transmission across member devices is required, a stack link set for the VD is selected for bearing a service message to be transmitted through a query to the forwarding entries. The stack link used for forwarding the service message to another member device may not necessarily be the stack link connected to the interface board that has received the service message from the VD. Alternatively, the message may be passed to another interface board corresponding to the same VD for transmission. Thus, it can be a stack link connected to other interface boards belonging to the same VD as the interface board that has received the service message that ultimately transmits the service message.

In FIG. 4, for example, if interface boards 1 and 2 in member device 1 are allocated to VD1, and interface board 1 in member device 2 is allocated to VD1 for use, then interface board 1 in member device 2 can establish stack links to both interface boards 1 and 2 in member device 1. Alternatively, interface board 1 in member device 2 can establish a stack link only with interface board 1 in member device 1 or only with interface board 2 in member device 1.

In this example, when interface board 1 in member device 1 receives a service message, it may provide the service message to interface board 2 via an internal channel of member device 1. Thereafter, the service message can be transmitted to member device 2 via a stack link between interface board 2 of member device 1 and interface board 1 of member device 2.

The physical stack interfaces P11, P12, P13 and P14 are all connected with member device 2, and the managing VD, i.e., VD1 at the primary control board, configures P11, P12, P13 and P14 into a stack port on a control plane for control message forwarding. Thus, the stack port can be called a control stack port. Similarly, P21, P22, P23 and P24 can also be configured into a stack port.

Control message forwarding is implemented on the control plane based on an internal topology table of the IRF system, and all VDs share the internal topology table within the IRF system. Each VD can use any stack member interface included in the control stack port to transmit a control message across member devices. Thus, as long as a stack member interface included in the control stack port is in a normal connecting state, control messages can be forwarded between member devices properly, thereby preventing stack unwinding of the member devices. Here, the control message may include: an inter-process communication (IPC) message, an STM message and so on.

The primary control board will provide configuration and management information to spare control boards. Consequently, upon switchover from the primary control board to a spare control board, if needed, the spare control board can take over the work of the primary control board to perform member device configuration and management.

Based on the above method, the present disclosure provides a member device for forwarding traffic flow in an IRF system, where the member device includes a control board and multiple interface boards. The control board is allocated to at least two VDs, and each interface board is allocated to one of the at least two VDs. Also, there is a stack link between a first interface board of the member device and a second interface board of another member device, where both interface boards belong to the same VD.

When an interface board receives a service message of the VD to which the interface board is allocated, forwarding entries stored in the interface board are checked. If the service message needs to be forwarded across member devices, the interface board transmits the service message through a stack link corresponding to the VD to which the interface board belongs.

The managing VD is created at the control board when the IRF system starts and is used for configuring other VDs at the control board and corresponding interface boards. Here, each interface board in a member device that has been assigned to a VD configures stack member interfaces for that VD for forming stack links to transmit service messages for that VD.

In a specific implementation of the present disclosure, control boards in a member device may include: a primary control board and a spare control board. Then, operations concerning configuration and management of the member device are implemented by the managing VD at the primary control board. Further, the managing VD at the control board uses stack member interfaces to form forwarding entries of a VD (e.g., the managing VD or any other VD in the IRF system) the stack member interfaces belong to and issues the forwarding entries to interface boards of the corresponding VD. In other words, the managing VD at the control board is responsible for managing forwarding entries across member devices within an IRF system, namely managing internal forwarding entries of the IRF system. Other VDs at the control board generate external forwarding entries for the IRF system and use service interfaces (i.e., external interfaces of the IRF system) to form the external forwarding entries.

The managing VD at the control board can define multiple stack member interfaces connected to the same member device as belonging to a control stack port. Each VD sends control messages between member devices via any stack member interface included in the control stack port. Control messages can be properly transmitted between member devices as long as a stack member interface in the control stack port is normally connected to a stack link in order to keep the stack of these member devices.

If a stack link is broken, causing the stack member interface connected to the stack link to be down, the managing VD at the control board will delete the stack member interface from a corresponding forwarding entry.

The internal structure of member device 1 or 2 as shown in FIG. 4 is only illustrative of the possible structure of a member device. Other configurations are possible.

It should be noted that, if more than one stack link is configured for a certain VD in the data plane, for example, there are multiple stack member interfaces at interface boards of a member device belonging to VD1 connected with another member device, the multiple stack member interfaces configured for VD1 can be defined as a stack port in the data plane for forwarding service messages of VD1. The stack port can also be called a service stack port.

Traffic flow balance can be achieved by using a mode of nesting a stack port on stack member interfaces in the data plane when service messages are to be transmitted across frames for the same VD. Here, an approach can be used to nest the stack port on the stack member interfaces. Thus, when forming forwarding entries of each VD by use of stack member interfaces, an output interface of the forwarding entries may be a service stack port of the VD and further be pointed to a number of stack member interfaces included in the service stack port.

When a stack member interface is down, it is removed from the forwarding entries. When all the stack member interfaces included in the service stack port of a VD are down, the service stack port is removed from the forwarding entries.

As can be seen from the above description, in the present disclosure, there is a stack link between interface boards of two member devices belonging to the same VD, which enables an interface board to forward a service message via a stack link connected with the interface board according to a forwarding entry stored in the interface board after the interface board receives the service message of the VD to which the interface board belongs. In this way, the traffic flow of different VDs can be forwarded between member devices of the IRF system.

In the case that more than two member devices in the IRF system have an interface board belonging to the same VD, stack links with a chain or ring shape can be established among these member devices. For example, if there are four member devices A-D allocated to VD1 in an IRF system, then at least one stack link can be established between member devices A and B, member devices B and C, and member devices C and D, respectively to form a chain-shaped connection for VD1. Alternatively, at least one stack link can be established between member devices A and B, member devices B and C, member devices C and D, and member devices D and A, respectively to form a ring-shaped connection for VD1.

Thus, in each of the various examples given, a method and a member device for forwarding traffic flow within an IRF system are provided. Consequently, the principles of the present specification enable traffic flow transmission across member devices for each VD of the IRF system.

A method for forwarding traffic flow in an Intelligent Resilient Framework (IRF) system is disclosed as an example. The method includes: allocating each member device in the IRF system to at least two virtual devices and configuring at least one stack link for each virtual device in order to connect interface boards among different member devices. When it is determined according to a forwarding entry of an interface board in a first member device that receives a service message that the service message is to be transmitted to a second member device, the method includes forwarding the service message via the at least one stack link configured for the virtual device of the interface board. Specifically, each interface board is allocated to a particular VD for use.

A member device in an Intelligent Resilient Framework (IRF) system is disclosed as an example, which includes at least one control board and multiple interface boards. Each control board is shared by multiple virtual devices, while each interface board is allocated to a particular virtual device among the multiple virtual devices. At least one stack link is configured for each virtual device in order to connect interface boards corresponding to that virtual device between that member device and another member device in the IRF system.

In another example, a method for forwarding traffic flow within an IRF system is provided, which is applied in the IRF system including at least two member devices. Each member device is allocated to at least two virtual devices, and there is a stack link between interface boards of the at least two member devices belonging to the same virtual device. When an interface board of a member device receives a service message of the VD to which that interface board belongs, forwarding entries of the interface board are searched. When it is determined that the service message is to be transmitted across member devices, the interface board forwards the service message via a stack link of an interface board corresponding to that VD.

In another example, a member device for forwarding traffic flow within an IRF system is provided, which is applied in an IRF system including at least two member devices. The member device includes a control board and interface boards. The control board is allocated to at least two virtual devices, and each interface board is allocated to one of the at least two virtual devices. There is a stack link between interface boards of the member device and another member device belonging to the same virtual device. The interface board of the member device searches forwarding entries of the interface board when it receives a service message of the VD to which that interface board belongs. When the service message is to be transmitted across member devices, the interface board then forwards the service message via a stack link corresponding to the VD to which the interface board belongs.

It can be seen from the above technical solutions that at least one stack link is made to correspond to each VD between the two member devices in the present example. Then, an interface board of a member device can use the stack link connected with that interface board itself to forward a service message when the interface board receives the service message of the VD to which the interface board belongs. The interface board forwards the service message according to forwarding entries stored in the interface board in order to achieve traffic flow forwarding across member devices for each VD in the IRF system.

In yet another example, an Intelligent Resilient Framework (IRF) system is provided that includes at least two member devices. Each member device is allocated to at least two virtual devices, and interface boards of different member devices are connected by at least one stack link for each virtual device.

Each member device forwards a service message that is to be transmitted to another member device via the at least one stack link corresponding to the virtual device of the interface board receiving the service message.

Further, the member device configures stack member interfaces connecting with the at least one stack link of a virtual device into a service stack port and transmits a service message of a virtual device to another member device via any stack member interface included in the service stack port for the virtual device.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method for forwarding service messages in an Intelligent Resilient Framework (IRF) system, comprising:
   allocating each member device in the IRF system to at least two virtual devices, and configuring at least one stack link for each virtual device in order to connect interface boards among different member devices; and
   when it is determined according to a forwarding entry of an interface board in a first member device receiving a service message that the service message is to be transmitted to a second member device, forwarding the service message via the at least one stack link configured for the virtual device of that interface board.

2. The method according to claim 1, further comprising:
   creating a managing virtual device at a control board of a member device during startup of the IRF system; and
   with the managing virtual device, configuring other virtual devices at the control board and interface boards of the IRF system, and configuring at each interface board stack member interfaces for a virtual device to which the interface board belongs for connecting corresponding stack links.

3. The method according to claim 2, further comprising:
   with the managing virtual device, generating forwarding entries of a virtual device according to stack member interfaces of the virtual device, and issuing the forwarding entries to the interface board of that virtual device.

4. The method according to claim 3, further comprising:
   when a stack link is disconnected and a stack member interface connected with the stack link is down, deleting with the managing virtual device the stack member interface from a corresponding forwarding entry.

5. The method according to claim 2, further comprising:
   with the managing virtual device, configuring multiple stack member interfaces connected with a member device into a control stack port, and transmitting a control message to the member device via any stack member interface included in the control stack port for every virtual device.

6. The method according to claim 2, further comprising:
   with the managing virtual device, configuring multiple stack member interfaces in a member device that are configured for a virtual device into a service stack port, and transmitting a service message to another member device via any stack member interface included in the service stack port for the virtual device.

7. A member device in an Intelligent Resilient Framework (IRF) system, comprising: at least one control board and multiple interface boards;
   wherein each control board is shared by multiple virtual devices, each interface board is allocated to a virtual device among the multiple virtual devices, and at least one stack link is configured for each virtual device in order to connect interface boards between the member device and another member device in the IRF system; and
   each of the multiple interface boards is to receive a service message of the virtual device to which that interface board corresponds, and forward the service message via the at least one stack link configured for the virtual device to which that interface board corresponds if it is determined according to a forwarding entry of the interface board that the service message is to be transmitted to the another member device.

8. The member device according to claim 7, further comprising:
   a managing virtual device set at the at least one control board of the member device, to configure other virtual devices at the at least one control board and the multiple interface boards, and configure, at each interface board, a stack member interface for a virtual device to which the interface board belongs for connecting corresponding stack links.

9. The member device according to claim 8, wherein the managing virtual device is further to:
   generate forwarding entries of a virtual device according to stack member interfaces of the virtual device and issue the forwarding entries to the interface board of the virtual device.

10. The member device according to claim 9, wherein the managing virtual device is further to:
    delete a stack member interface from a corresponding forwarding entry when a corresponding stack link is disconnected and the stack member interface connected with the stack link is down.

11. The member device according to claim 8, wherein the managing virtual device is further to:
    configure multiple stack member interfaces of the member device which are connected with a second member device into a control stack port, and transmit a control message to the second member device via any stack member interface included in the control stack port for every virtual device in the IRF system.

12. The member device according to claim 8, wherein the managing virtual device is further to:
    configure multiple stack member interfaces of the member device that are configured for a virtual device into a service stack port, and transmit a service message to another member device via any stack member interface included in the service stack port for the virtual device.

13. An Intelligent Resilient Framework (IRF) system, comprising:

at least two member devices;
wherein each member device is allocated to at least two virtual devices, and interface boards of different member devices are connected by at least one stack link for each virtual device; and
one of the member devices is to forward a service message to be transmitted to another member device via the at least one stack link of an interface board corresponding to a particular virtual device sending the service message.

14. The system according to claim 13, wherein at least one of the member devices is further to configure stack member interfaces connecting with the at least one stack link of a virtual device into a service stack port, and transmit a service message of a virtual device to another member device via any stack member interface included in the service stack port for that virtual device.

* * * * *

UNITED STATES PATENT AND TRADEMARK OFFICE
CERTIFICATE OF CORRECTION

PATENT NO. : 8,738,802 B2
APPLICATION NO. : 13/884575
DATED : May 27, 2014
INVENTOR(S) : Chi Fan et al.

It is certified that error appears in the above-identified patent and that said Letters Patent is hereby corrected as shown below:

In the Specification

In column 1, line 4, below "SYSTEM"
insert -- CLAIM FOR PRIORITY
The present application is a national stage filing under 35 U.S.C 371 of PCT application number PCT/CN2011/080913, having an international filing date of Oct. 18, 2011, which claims priority to Chinese Patent Application No. 201010552345.X, filed on Nov. 18, 2010, the disclosures of which are hereby incorporated by reference in their entireties. --, therefor.

Signed and Sealed this
Thirtieth Day of September, 2014

Michelle K. Lee
*Deputy Director of the United States Patent and Trademark Office*